US005313050A

United States Patent [19]

Hiroki et al.

[11] Patent Number: 5,313,050

[45] Date of Patent: May 17, 1994

[54] CASH MANAGING SYSTEM

[75] Inventors: Hisayuki Hiroki, Yokohama; Takeo Hashimoto, Kawasaki; Yoshitaka Sakoguchi, Yokohama, all of Japan

[73] Assignee: Kabushiki Kaisha Toshiba, Kawasaki, Japan

[21] Appl. No.: 6,960

[22] Filed: Jan. 21, 1993

[30] Foreign Application Priority Data

Jan. 20, 1992 [JP] Japan .................................... 4-7741

[51] Int. Cl.[5] .............................................. G06F 15/30

[52] U.S. Cl. ....................................... 235/379; 902/12

[58] Field of Search .......................... 235/379; 902/12; 209/534

[56] References Cited

U.S. PATENT DOCUMENTS 5,247,159 9/1993 Yuck et al. ......................... 235/379

*Primary Examiner*—Harold Pitts

*Attorney, Agent, or Firm*—Cushman, Darby & Cushman

[57] ABSTRACT

A cash managing system comprises a plurality of automatic teller machines for receiving and dispensing cash from and to a customer, a cash arrangement device for arranging cash to be handled in the teller machines, and a plurality of loading safes. Each loading safe is designed to be selectively mounted in a desired one of the teller machines and the cash arrangement device, and transfers cash between the teller machine and the cash arrangement device. The cash arrangement device includes a data memory for storing cash data with respect to each teller machine. The cash data includes denominations and the amount of cash to be loaded in each teller machine. When a loading safe is mounted in a mount section of the cash arrangement device, a transfer mechanism of the device transfers cash, having the denomination and amount stored in the memory means, to the mounted loading safe.

10 Claims, 21 Drawing Sheets

39

| | |
|---|---|
| ¥1,000 BANK NOTE SAFE | ○ ○ ○ ○ YEN |
| ¥10,000 BANK NOTE SAFE | ○ ○ ○ ○ YEN |
| BANK NOTE RECEPTION SAFE | ○ ○ ○ ○ YEN |
| LOADER | ○ ○ ○ ○ YEN |

F I G. 5

| ATM NO (N) | NUMBER OF SAFE | CASH DATA |
|---|---|---|
| 1 | A | ONE THOUSAND ¥10000 BANK NOTES |
| 2 | B | FIVE HUNDRED ¥10000 BANK NOTES |
| 3 | C | EIGHT HUNDRED ¥10000 BANK NOTES |
| ⋮<br>n | ⋮ | ⋮ |

FIG. 18A

| NUMBER OF SAFE | TIME DATA | STARTING TIME |
|---|---|---|
| A | NOVEMBER 17 | OCTORBER 3 |
| B | NOVEMBER 20 | NOVEMBER 5 |
| C | NOVEMBER 17 | OCTORBER 3 |
| ⋮ | ⋮ | ⋮ |
| ⋮ | ⋮ | ⋮ |

F I G. 18B

CASH MANAGING SYSTEM

BACKGROUND OF THE INVENTION

1. Field of the Invention

The present invention relates to a cash managing system which comprises a plurality of automatic teller machines, installed in, e.g., a bank, for automatically managing cash, i.e., bank notes, and which collectively manages the bank notes and information in the teller machines.

2 Description of the Related Art

Cash loading and unloading in and from various types of teller machines used in banks and the like are currently performed manually, and human factors are present in this management. Accordingly, when an actual amount of bank notes does not coincide with data, time-consuming, cumbersome procedures must be taken to find the cause.

For this reason, a system disclosed in Published Unexamined Japanese Patent Application No. 61-234487 comprises a loader that can be commonly used for a plurality of teller machines, and bank note loading/unloading operations with respect to the teller machines are performed not manually but by using the loader.

The loader comprises a collectively storing box which has an interface section so that the storing box can be commonly used for the teller machines. Thus, bank note can be transferred by storing bank notes in the storing box without touching the bank notes and loading the box into another teller machine. However, in this loader, it is necessary to input denominations and the amount of the bank notes when they are stored into the storing box.

At the opening of banks and the like, it is necessary to input denominations and the amount of the bank notes to a number of storing boxes which are to be loaded in teller machines. Thus, the input operation is troublesome and it is feared that incorrect information may be input.

Generally, in banks and the like, the storing boxes in the teller machines are periodically collected and the number of bank notes is counted, in order to confirm the number of bank notes. However, upon using the storing boxes having the above-mentioned structure, the clerk should judge that which storing box should be collected. Thus, it is feared that a desired storing box or storing boxes is not collected or an undesired storing box or boxes is collected.

Further, by installing a memory in the above-mentioned storing box, it is possible to manage the number of bank notes in the storing box by means of the storing box itself. However, in this case, when the life of the memory has expired, the data stored in the memory is deleted, thus low in reliability.

SUMMARY OF THE INVENTION

The present invention has been made in consideration of the above situation, and its object is to provide a cash managing system capable of automatically and effectively loading a plurality of automatic teller machines with bank notes, taking bank notes therefrom, managing the bank note balance, and performing total management of these operations.

In order to achieve the above object, a cash managing system according to the present invention comprises a plurality of automatic teller machines for receiving and dispensing cash; a cash arrangement device for arranging cash to be handled in the teller machines; and a plurality of loading safes selectively mounted in the teller machines and the cash arrangement device, and being able to be loaded with cash.

The cash arrangement device includes memory means for storing cash data with respect to each teller machine, including denominations and the amount of cash to be loaded in each teller machine; a mount section for detachably storing the loading safe; and transfer means for transferring cash to the loading safe mounted in the mount section, based on the denomination and amount stored in the memory means.

According to the cash managing system with the above-described structure, when a loading safe is mounted in the cash arrangement device, cash with a predetermined denomination and amount are automatically loaded in the loading safe based on the cash date in the memory means. Accordingly, by mounting the loading safe in a corresponding teller machine, cash with the predetermined denomination and amount can be can be easily and correctly transferred from the cash arrangement device to the corresponding teller machine.

According to another aspect of the invention, each loading safe has first memory means for storing identification data of the loading safe. The cash arrangement device includes second memory means for storing the identification data and collecting time of the loading safes to be collected, means for collating the identification data stored in the first memory means of the loading safe which is mounted in the cash arrangement device with the identification data of the loading safe stored in the second memory means, and means for displaying the collation result.

With this structure, based on the displayed collation result, it can be clearly determined whether or not there is a loading safe which has been incorrectly collected, and whether or not there is an uncollected loading safe among loading safes which should be collected.

According to a further aspect of the invention, each of the loading safes has first memory means for storing identification data thereon, and the first memory means has a predetermined memory guarantee time period. The cash arrangement device includes second memory means for storing the identification data of the loading safes and the memory guarantee time period of the first memory means, means for determining whether or not there is a first memory means whose memory guarantee time period has elapsed, and means for displaying the identification data of the loading safe having the first memory means whose memory guarantee time period has elapsed.

In this structure, the displaying means displays the determination result, on the basis of the data on the memory guarantee time period and identification data of the loading safe stored in the first and second memory means. Thus, without stopping the teller machines, any uncollected loading safe can be checked within the memory guarantee time period, thereby preventing management errors and enhancing the reliability of stored data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 21 show a cash managing system according to an embodiment of the present invention, in which:

FIG. 1 is a perspective view schematically showing the overall arrangement of the cash managing system;

FIG. 2 is a block diagram showing the configuration of the cash managing system;

FIG. 3 is a perspective view showing an outer appearance of a automatic teller machine;

FIG. 4 is a block diagram showing an internal configuration of the teller machine;

FIG. 5 is a table showing a memory content of a RAM of the teller machine;

FIG. 6 is a sectional view showing the internal arrangement of a bank note receiving/dispensing unit;

FIGS. 7 and 8 are sectional views, respectively, schematically showing the flow of bank notes in a bank note receiving operation;

FIG. 9 is a sectional view schematically showing the flow of bank notes in a bank note dispensing operation;

FIG. 10 is a sectional view schematically showing the flow of bank notes in an operation for recovering the bank notes forgotten by a customer;

FIG. 11 is a sectional view schematically showing the flow of bank notes in a loading operation;

FIG. 12 is a sectional view schematically showing the flow of reject bank notes;

FIG. 13 is a sectional view schematically showing the flow of bank notes in an inspection operation;

FIG. 14 is a perspective view of a loading safe; FIG. 15 shows a memory content of the data memory of the loading safe;

FIG. 16 is a sectional view showing an internal arrangement of a bank note arrangement device;

FIGS. 17, 18A and 18B show examples of memory contents of a data memory employed in the arrangement device;

FIG. 19 is a flowchart illustrating data supply operation;

FIG. 20 is a flowchart illustrating how the loading safe is collected on the basis of its collecting time; and FIG. 21 is a flowchart illustrating how the loading safe is collected on the basis of the memory guarantee time period of the data memory.

DETAILED DESCRIPTION OF THE PREFERRED EMBODIMENT

A preferred embodiment of the present invention will be described with reference to the accompanying drawings.

Figure 1:
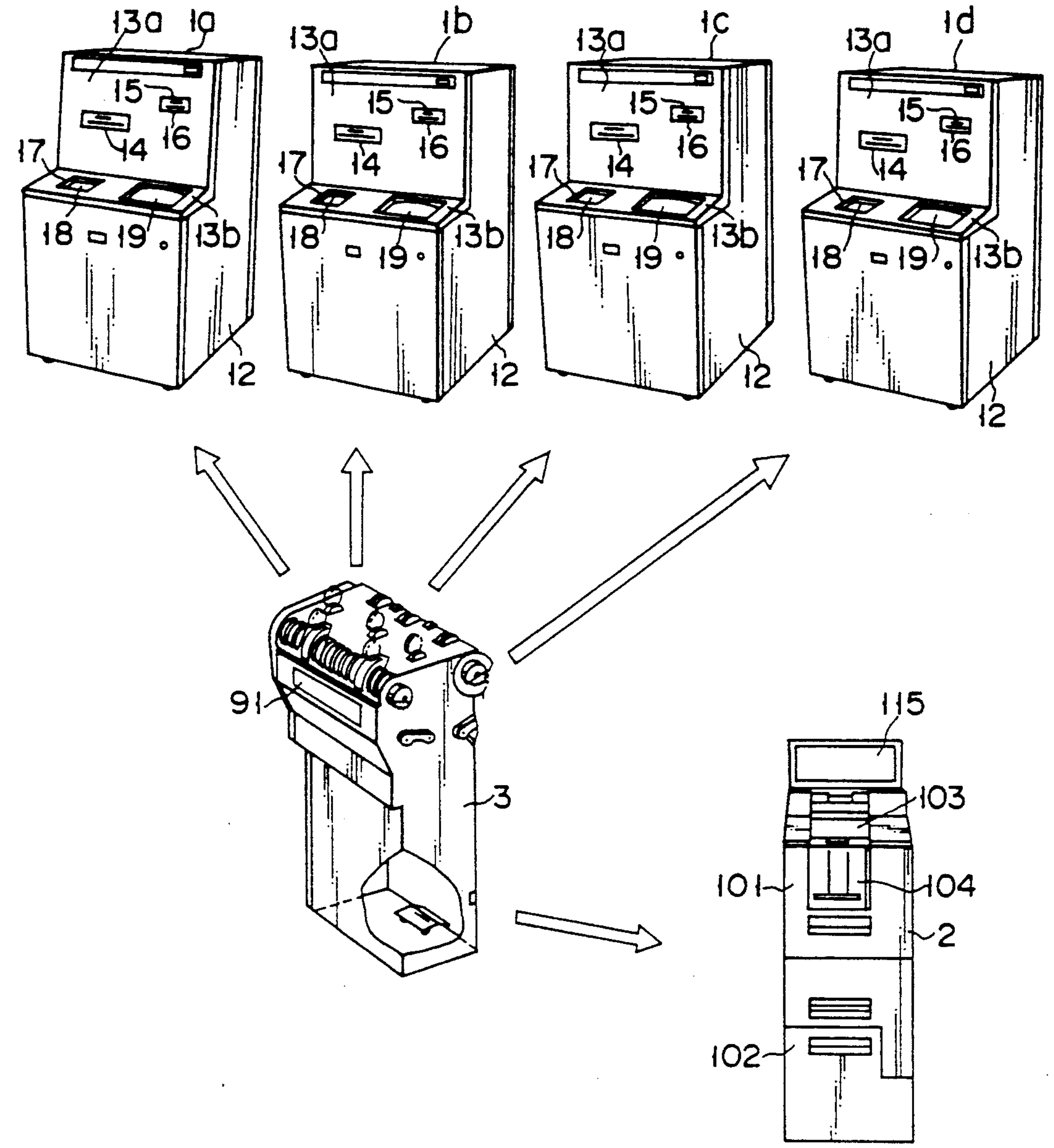
Figure 2:
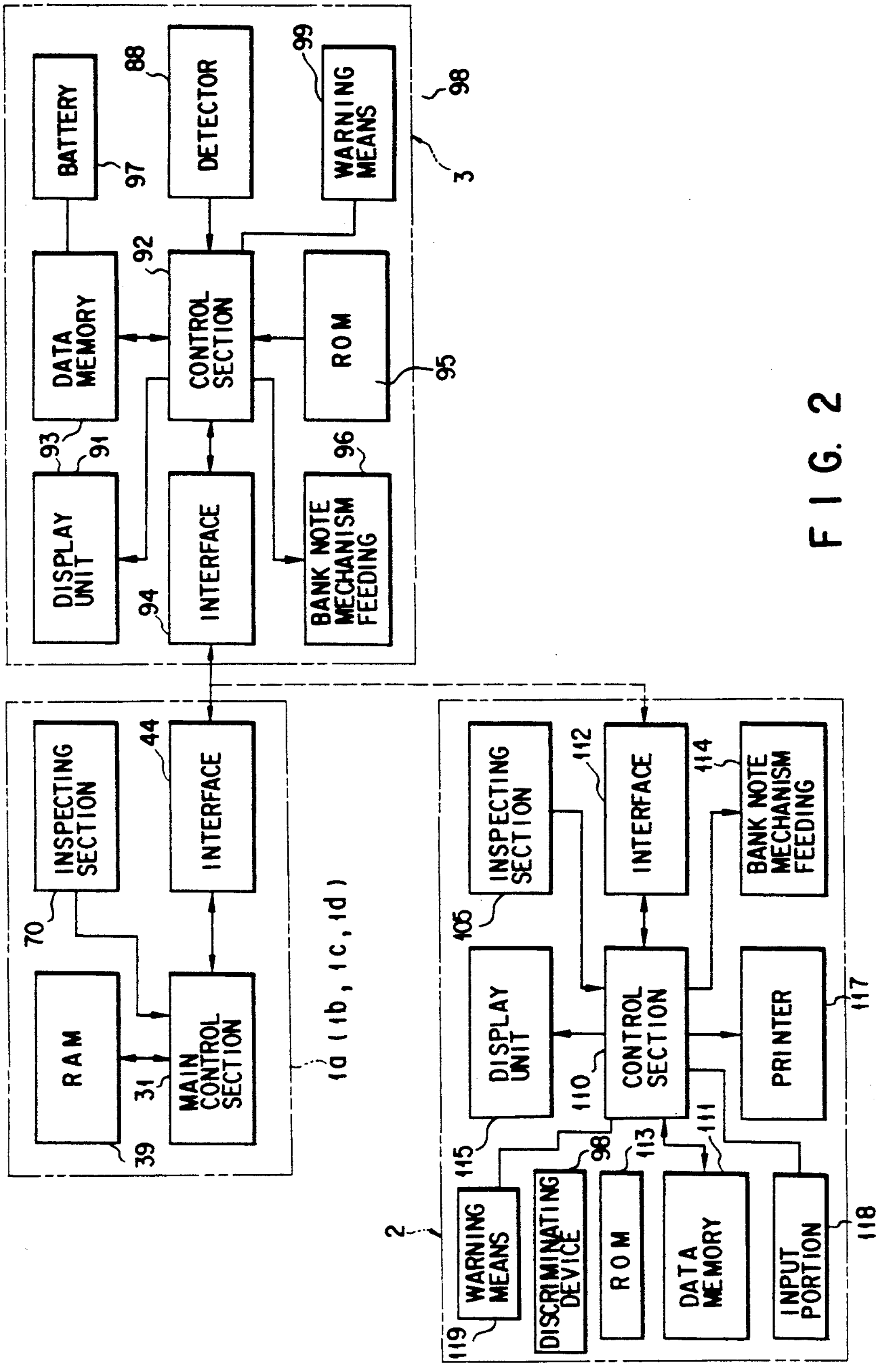

As shown in FIGS. 1 and 2, a cash managing system according to the embodiment of the present invention comprises automatic teller machines 1*a*, 1*b*, 1*c*, and 1*d* as a plurality (four), a bank note arrangement device 2, and a plurality of loading safes 3 (only one is shown) each serving as a loader or a bank note cassette, which can be selectively loaded in each of the teller machines and the arrangement device 2.

Figure 3:
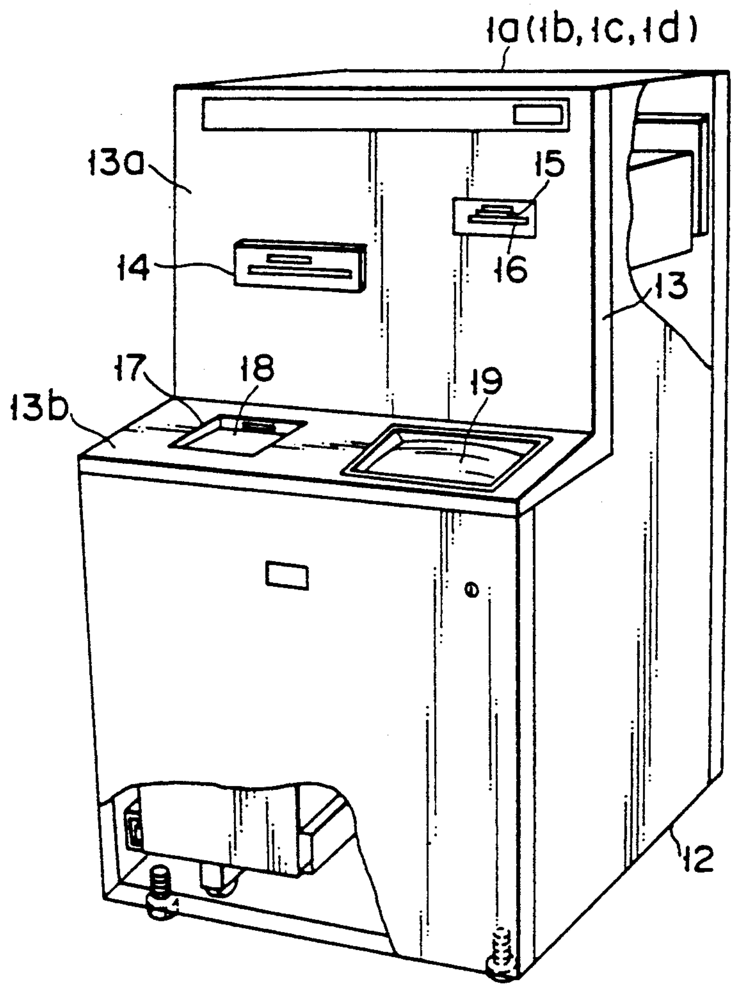
Figure 4:
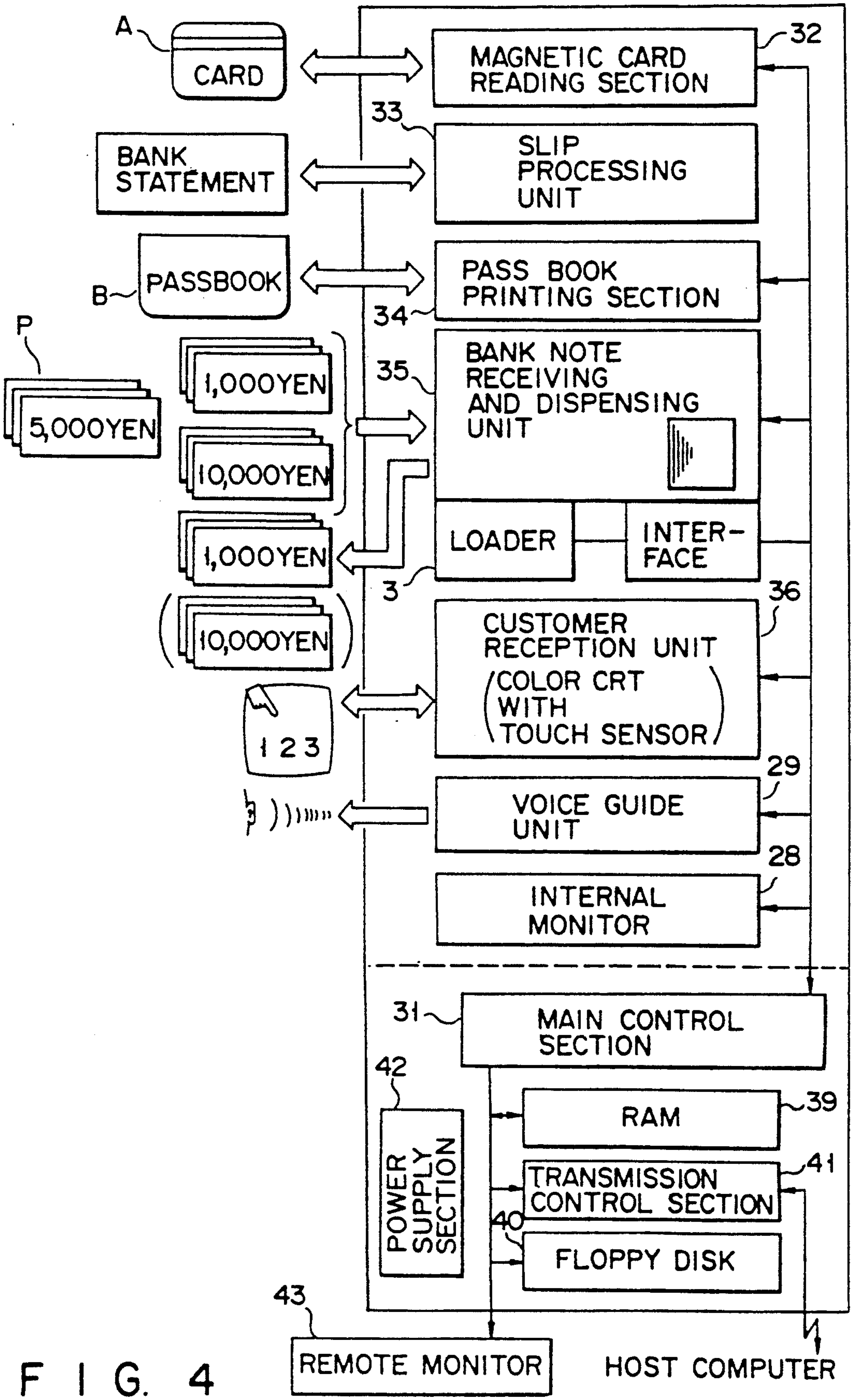

The teller machines 1*a* to 1*d* have the same configuration and thus will be represented by the machine 1*a* with reference to FIGS. 3 to 5.

As shown in FIG. 3, the teller machine 1*a* has a housing 12, and a substantially L-shaped operation section 13 is formed on the front surface of the housing 12. A passbook insertion slot 14, a card insertion slot 15, and a bank statement issuing slot 16 are formed in a vertical portion 13*a* of the operation section 13.

A receiving/dispensing opening 17 as a bank note receiving portion which serves as both reception and dispensing openings is formed in a horizontal portion 13*b* of the operation section 13, and a door 18 for opening and closing the opening 17 is provided at the opening 17. A CRT display unit 19 incorporating touch sensors is provided at the horizontal portion 13*b*. The display unit 19 displays an operation sequence of the teller machine and other information by using an illustration, characters, and words and sentences, in order to prompt the user. When the user depresses a display portion corresponding to his secret identification number, an amount of bank notes, an account number, approval of the transaction, confirmation, or cancellation displayed on the display unit 19, the teller machine is operated.

As shown in FIGS. 2 and 4, the housing 12 incorporates a main control section 31, a magnetic card reading section 32, a bank statement processing unit 33, and a passbook printing section 34. The main control section 31 controls the entire teller machine. When a card A is inserted through the card insertion slot 15, the reading section 32 reads account information, e.g., a secret identification number, an account number, and the like from a magnetic stripe on the card A. The processing unit 33 issues a bank statement printed with the transaction content through the issuing slot 16. The passbook printing section 34 reads the magnetic stripe on a passbook B inserted through the passbook insertion slot 14 and records the transaction content on journal paper (not shown).

The housing 12 also incorporates a bank note receiving/dispensing unit 35, a customer reception unit 36, a voice guide unit 29, and an operator unit having an internal monitor 28. The bank note receiving/dispensing unit 35 accepts a bank note P inserted in the bank note receiving/dispensing opening 17 and dispenses bank notes P in a designated amount to the openings 17. The customer reception unit 36 includes the CRT display unit 19. The voice guide unit 29 produces a voice through a loudspeaker (not shown) to guide the customer. The operation unit with the internal monitor 28 a person in charge is operated by him. When the loading safe 3 is mounted in the bank note receiving/dispensing unit 35, it is connected to the main control section 31 through an interface 44 and transfers data between the unit 35 and the safe.

The housing 12 also incorporates a RAM 39, a floppy disk drive 40, a transmission control section 41, and a power supply section 42. The RAM 39 stores bank note storing states of the respective safes in the unit 35 and the loading safe 3 in accordance with an inspection result supplied from an inspecting section (to be described later) in the unit 35. The floppy disk drive 40 serves as a data file for storing information of financial institutions, e.g., the names of banks and branches, which are required for transfer transactions, in the order of the Japanese syllabary. The transmission control section 41 controls data transmission between the main control section 31 and a host computer (not shown). The RAM 39 stores the stored amounts in units of safes, as shown in FIG. 5.

The main control section 31 is connected to a remote monitor 43 for the person in charge, which is provided outside the housing 12. Local processing (examination processing for examining the internal state of the teller machine) such as bank note balance detection, safe exchange, or journal replenishment is designated to the person in charge through the internal monitor 38 and the remote monitor 43.

The main control section 31 and the loading safe 3 set in the receiving/dispensing unit 35 are connected to each other through an interface (not shown). The set of the loading safe 3 in the unit 35 is confirmed through data transfer between the main control section 31 and the safe 3. The main control section 31 supplies data of the bank note storing states of the respective safes of the teller machine 1*a* to the loading safe 3, and the safe 3 sends the bank note storing state thereof to the main control section 31.

Figure 6:
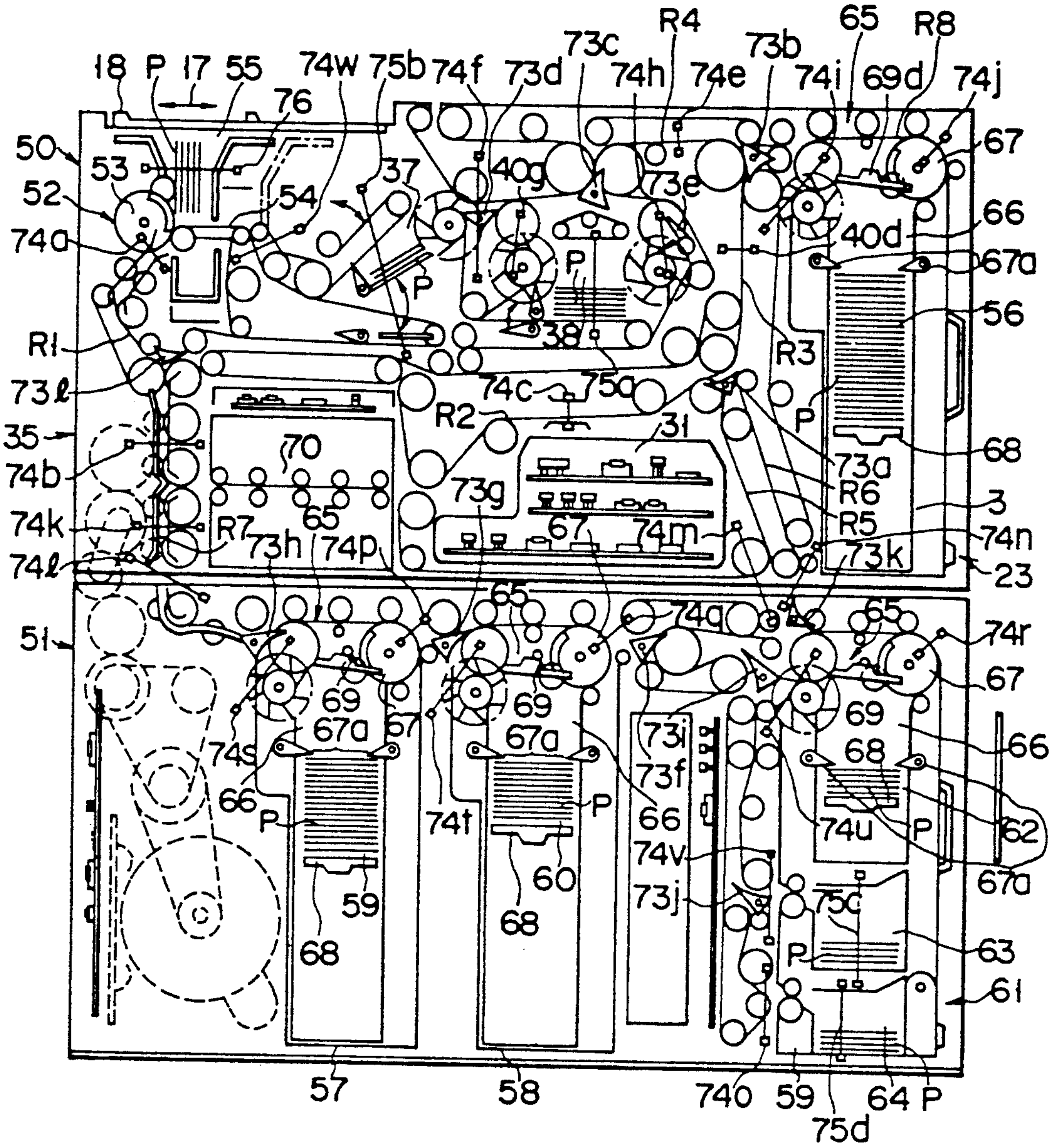

FIG. 6 shows the arrangement of the bank note receiving/dispensing unit 35. The unit 35 mainly has upper and lower units 50 and 51.

A bank note take-in/take-out unit 52 is provided in an upper front (directed to the customer) portion of the upper unit 50 and opposes the opening 17. The unit 52 has a take-in roller 53, a floor 54, and a bank note storage chamber 55. A mounting section 23 is provided in the rear portion of the upper unit 50. The loading safe 3 as a fourth safe is designed to be set in the mounting section 23. The safe 3 has a storage section 56 storing bank notes P.

A first safe 57 as the ¥10,000 bank note safe and a second safe 58 as the ¥1,000 bank note safe are arranged in the lower unit 51 to constitute bank note storage sections 59 and 60, respectively. A third safe 61 is provide in the lower unit 51 and serves as a bank note reception safe for storing a bank note, e.g. ¥5,000 bank notes, reject bank notes, or recovery bank notes inappropriate to be dispensed. The safe 61 has a bank note storage section 62, a stacking section 63, and a recovery box 64. A stacking and taking mechanism 65 is provided at the upper portion of each of the safes 57, 58, 61, and 3, and flaps 67*a* for defining a stacking space 66 capable of stacking, e.g., 100 bank notes therein, are provided in each safe. Each mechanism 65 has a take-out roller 67, an elevator 68, and a press plate 69.

An inspecting section 70 is provided in the lower portion of the upper unit 50, and a stacking section 38 for temporary stacking bank notes to be dispensed and a stacking section 37 for temporary stacking the received bank notes are provided above the inspecting section 70.

A multiple of feed rollers and conveyer belts are arranged in the units 50 and 51 to form bank note convey paths R1 to R8 for conveying bank notes P to the respective sections inside the unit 35. Gates 73*a* to 73*l* connected to rotary solenoids (not shown) as the drive sources are arranged at branching portions of the convey paths. Detectors 74*a* to 74*w* for detecting passing of the bank notes are arranged at predetermined portions along the bank note convey paths. Detectors (remaining bank note check sensors) 75*a* to 75*d*, and 76 for detecting presence/absence of the bank notes are arranged at the respective stacking sections where the bank notes P are stacked. The detectors 74*a* to 74*w* and the detectors 75*a* to 75*d*, and 76 have a known construction including a light-emitting element and a light-receiving element.

The operation (flow of the bank note) of the bank note receiving/dispensing unit 35 having the above arrangement will be described.

Figure 7:
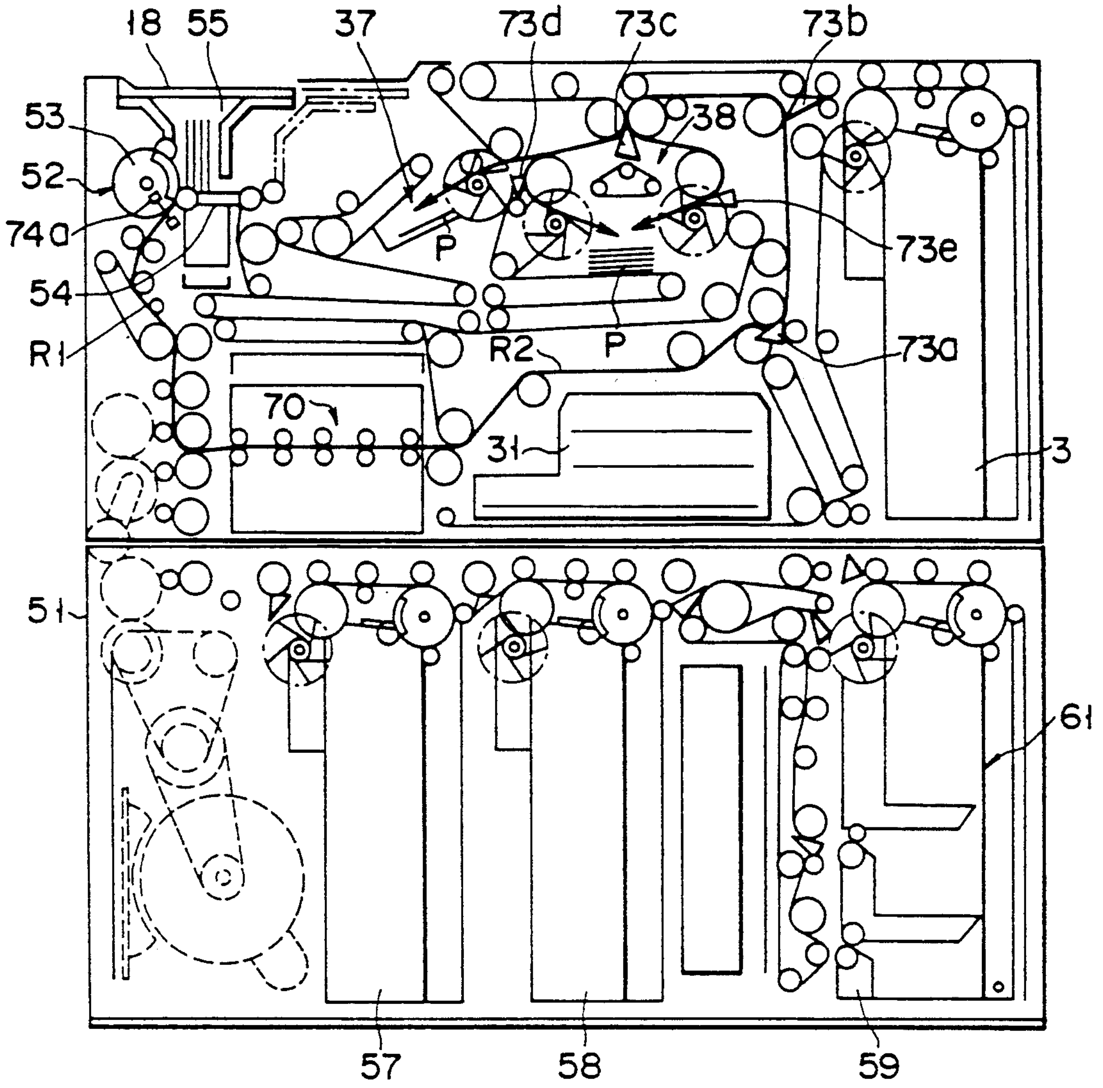
Figure 8:
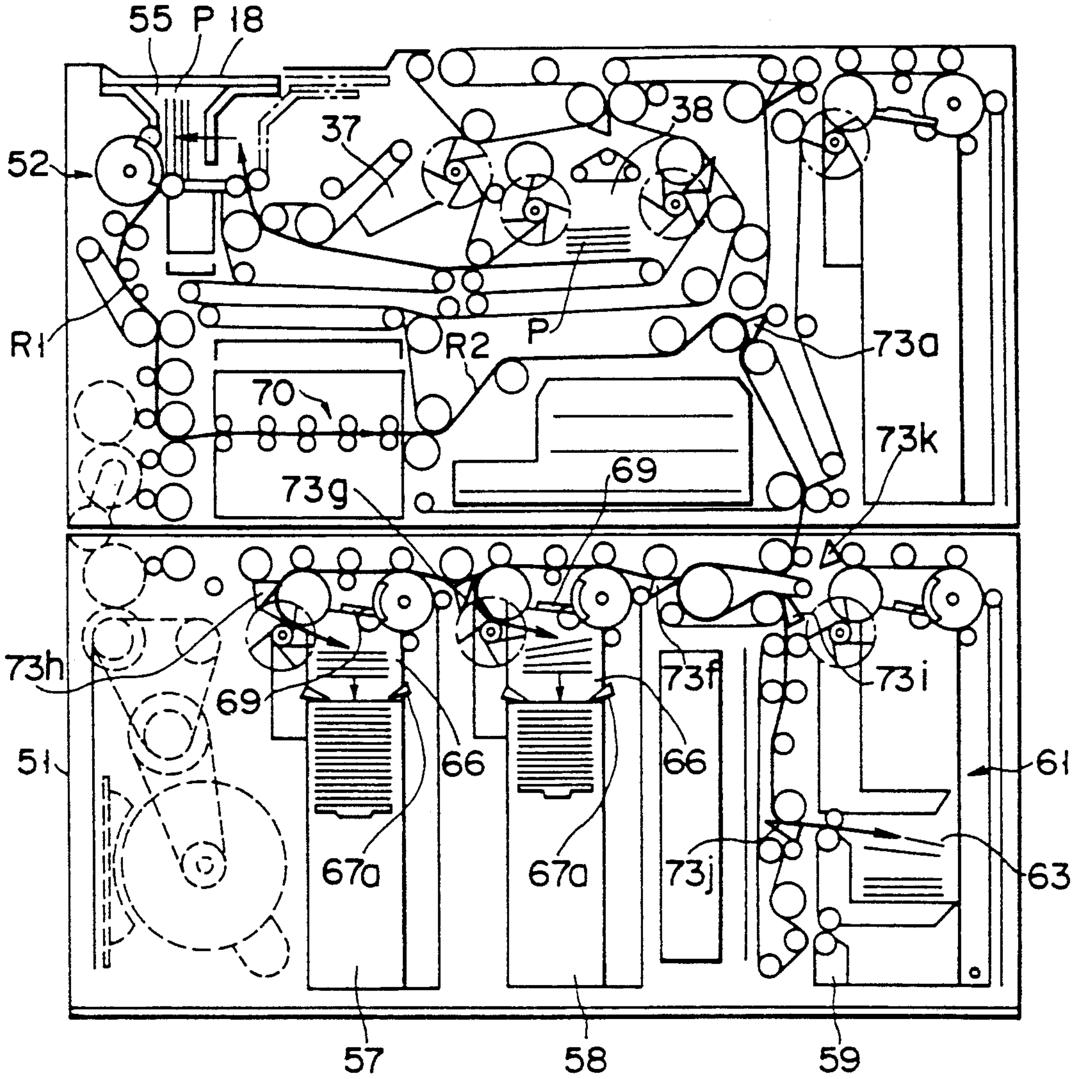

Both FIGS. 7 and 8 show the flows of the bank notes in a bank note deposit operation.

More specifically, when a display portion of the CRT display unit 19 corresponding to a deposit is depressed by a customer, the door 18 of the bank note receiving/-dispensing opening 17 is opened. The customer places various kind of bank notes P in an upright state as a unit in the bank note storage chamber 55 through the opening 17 while the obverse and reverse sides of the bank notes are not aligned. Then, the door 18 is closed. When closing of the door 18 is detected by a sensor (not shown), the floor 54 is vertically vibrated to align the bank notes P, and subsequently, the take-in roller 53 is rotated to sequentially receive the bank notes P one by one from the front one. The received bank notes P are conveyed along the convey path R1, and the number of them is counted by the detector 74*a*.

The bank notes P are then conveyed to the inspecting section 70 to discriminate their denominations, authenticities, and the obverse/reverse sides. The bank notes P are then conveyed along the convey path R2. The bank notes, which are determined that their obverse sides face upward, are conveyed upward through the first gate 73*a*, pass through the second and third gates 73*b* and 73*c*, are redirected by the fourth gate 73*d*, and then are stacked in the temporary stacking section 38.

When a bank note is determined by the inspection unit 70 that its reverse side faces upward, it passes through the first to third gates 73*a* to 73*c*, is redirected by the fifth gate 73*e*, and is stacked upside down in the stacking section 38. In this manner, the bank notes P are stacked in the stacking section 38 such that their obverse and reverse sides are aligned.

When a bank note P is determined by the inspection unit 70 that it should be rejected (a reject bank note; a counterfeit bank note or a bank note unable to be inspected), it is sent to the temporary stacking section 37 through the first, second, third, and fourth sorting gates 73*am* 73*b*, 73*c*, and 73*d* and is stacked therein. When the bank notes P in the bank note storage chamber 55 run out, the reject bank notes P in the stacking section 37 are discharged to the storage chamber 55 in a bundle. Then, the door 18 is opened, and the bank note bundle is returned to the customer.

Regarding the bank notes P stacked in the bank note reception temporary stacking section 38, for example, when the customer confirms the deposited amount displayed on the CRT display unit 19 and enters "confirm", they are conveyed to the bank note storage chamber 55 in a bundle, and then received again and conveyed. As shown in FIG. 8, the received bank notes P are discriminated by the inspection unit 70 and are conveyed to the lower unit 51 through the path R defined by the first sorting gate 73*a*.

¥10,000 bank notes discriminated by the inspecting section 70 are horizontally conveyed through the eleventh, sixth, and seventh sorting gates 73*k*, 73*f*, and 73*g*, redirected by the eighth sorting gate 73*h*, and stacked in the stacking section 66 of ¥10,000 bank note safe 57. ¥1,000 bank notes are redirected by the seventh sorting gate 73*g* and stacked in the stacking section 66 of ¥1,000 bank note safe 58.

Old ¥10,000 a ¥1,000 bank notes ¥5,000 bank notes, and reject bank notes are redirected by the sixth sorting gate 73*f,* and stacked in the stacking section 63 of the bank note reception safe 61.

When all the bank notes P are stacked in the stacking sections 66 and 63 of the safes 57, 58, and 61, the bank notes P in the safes 57 and 58 are urged downward by the press plates 69 and locked and stacked under the flappers 67*a,* respectively. A deposit operation is thus completed.

If "disapprove" is entered through the display unit 19 while the bank notes P are stacked in the bank note reception temporary stacking section 38, the bank notes P in the section 38 are transferred to the bank note storage chamber 55 and returned to the customer as the door 18 is opened. When the bank notes p are removed from the storage chamber 55, the door 18 is closed.

In a deposit operation, if "cancel" is entered through, e.g., the CRT display unit 19 after the bank notes P are stacked in the stacking section 38, the bank notes P are discharged to the storage chamber 55 in a bundle. Then, the door 18 is opened to return the bank notes P to the customer.

Figure 9:
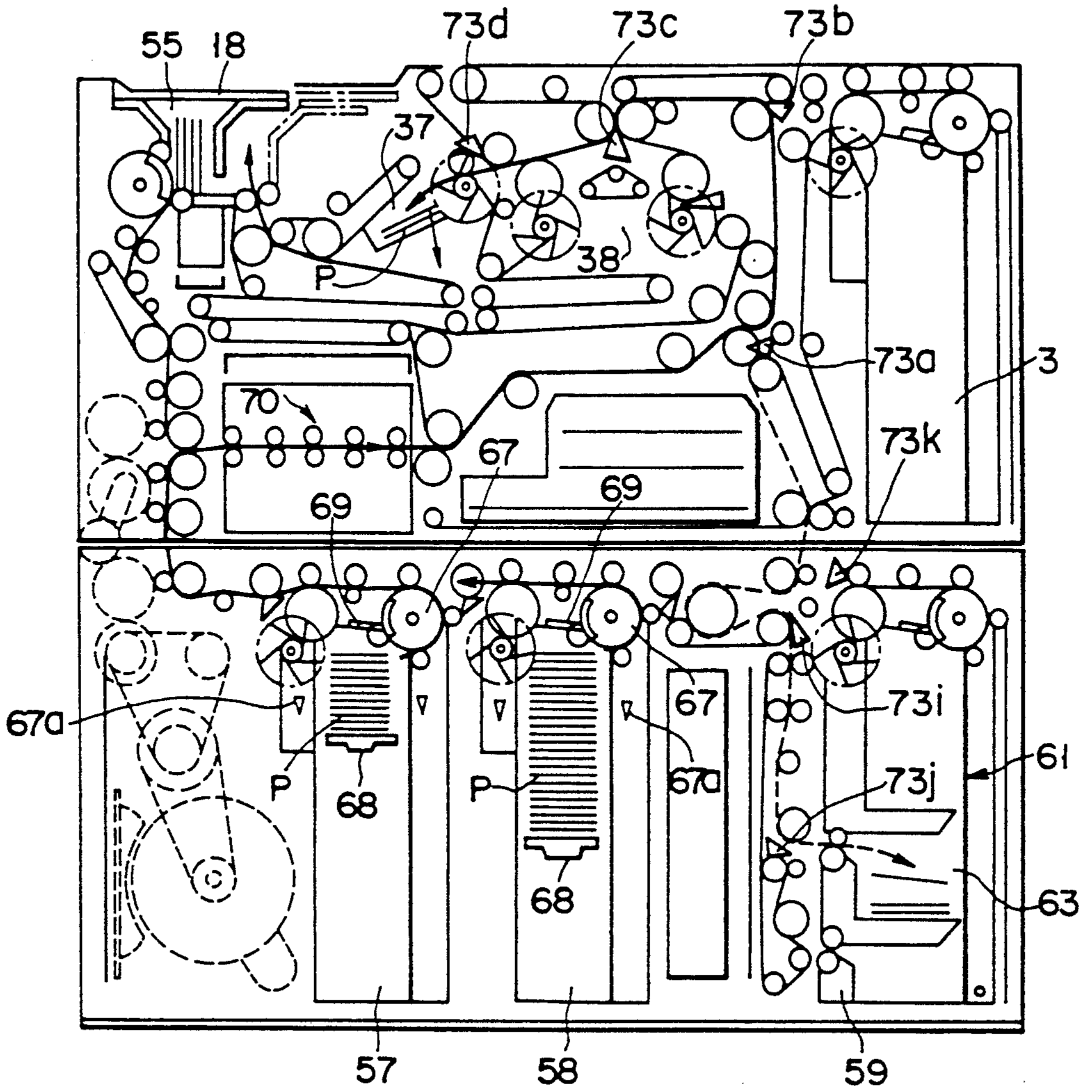

FIG. 9 shows the flow of bank notes in a dispensing operation.

A pre-dispensing operation is performed in the following manner. A dispensing transaction is selected through the CRT display unit 19 and an amount to be dispensed is entered. Then, in each of the safes 57 and 58, the press plate 69 urges the stored bank notes P downward to release the flappers 67*a.* The elevator 68 is moved upward to press the stored bank notes P against the pick-up roller 67.

When the pick-up rollers 67 are rotated ¥10,000 and ¥1,000 bank notes are picked up one by one from the bank note safes 57 and 58, respectively. The picked ¥10,000 and ¥1,000 bank notes are respectively counted an are conveyed horizontally forward to the upper unit 50. These bank notes P are sent to the inspection unit 70. The bank notes P which are determined as authentic ones are stacked in the bank note dispensing temporary stacking section 37 through the first to fourth gates 73*a* to 73*d.* Then, when the amount of bank notes P coincides the input amount to be dispensed, the pick-up of the bank notes P is stopped, and the bank notes P stacked in the stacking section 37 are discharged to the bank note storage chamber 55 in a bundle and returned to the customer as the door 18 is opened. When the customer withdraws the bank notes P, the door 18 is closed, and the dispensing transaction is completed.

Bank notes P discriminated by the inspecting section 70 as being inappropriate for dispensing (reject bank note) are sent to the lower unit 51 through the first sorting gate 73*a.* As indicated by a broken line in FIG. 9, they are sent to the stacking section 63 of the bank note reception safe 61 through the eleventh, sixth, ninth, and tenth sorting gates 73*k,* 73*f,* 73*i,* and 73*j,* and are stacked therein.

Figure 10:
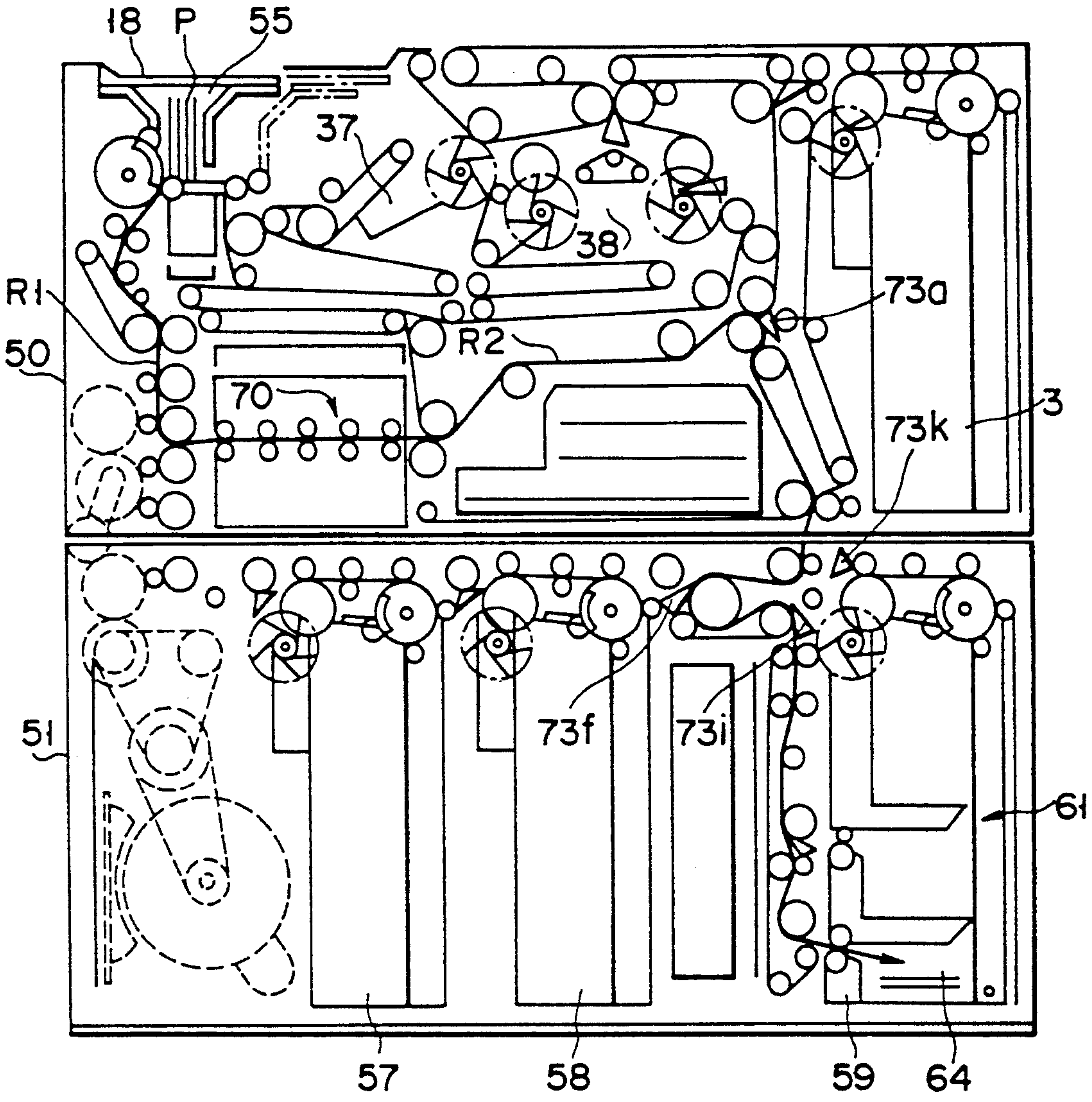

FIG. 10 shows the flow of bank notes in an operation for withdrawing the bank notes forgotten by the customer.

Specifically, while the door 18 is open, when the customer does not take out the dispensed bank notes P even after a lapse of a predetermined period of time, the door 18 is closed first. The bank notes P are received one by one from the storage chamber 55, and conveyed to the recovery box 64 of the reception safe 61 through the inspecting section 70 and the first, eleventh, sixth, ninth, and tenth sorting gates 73*a,* 73*k,* 73*f,* 73*i,* and 73*j.*

Figure 11:
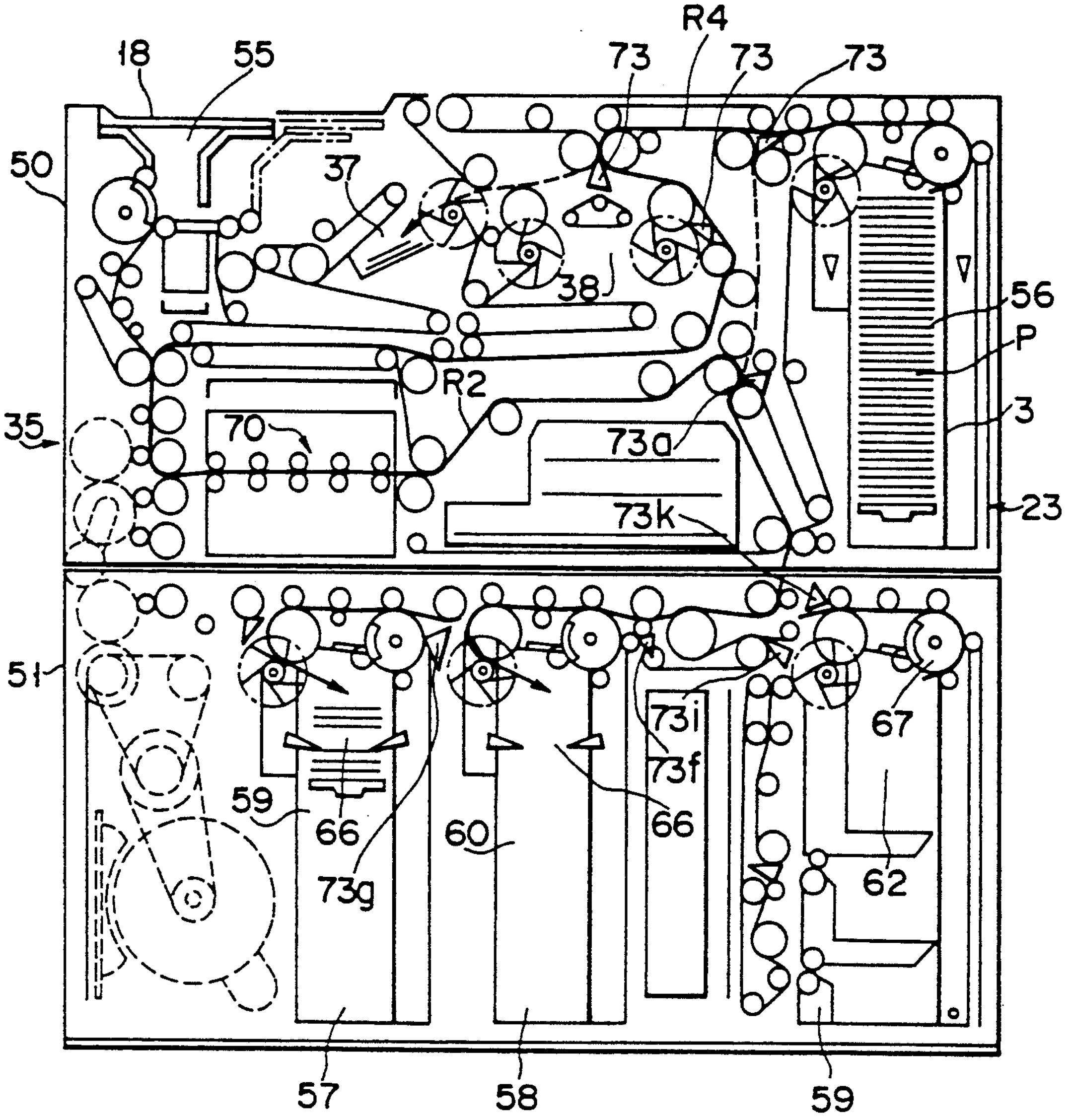

The flow of bank notes in a bank note loading (replenishing) operation will be described with reference to FIG. 11.

While the loading safe 3 storing bank notes P is set in the mount portion 23 of the upper unit 50, when a bank note loading mode is selected by the person in charge, the loading operation of bank notes P is started.

Specifically, the bank notes P are picked up from the storage section 56 by the pick-up roller 67 of the safe 3 one by one, and guided to the inspecting section 70 through the second, third, and fifth sorting gates 73*b,* 73*c,* and 73*e,* and the denominations of the bank notes P are discriminated. The discriminated bank notes P are conveyed downward through the first sorting gate 73*a,* and are sent through the eleventh and sixth gates 73*k* and 73*f.* In this case, ¥1,000 bank notes are redirected by the seventh sorting gate 73*g* and stacked in the stacking section 66 of the ¥1,000 bank note safe 58. ¥10,000 bank notes are conveyed through the seventh sorting gate 73*g,* redirected by the eighth sorting gate 73*h,* and stacked in the stacking section 66 of the ¥10,000 bank note safe 57. After that, these bank notes P are urged into the corresponding bank note storage sections 59 and 60.

Bank notes discriminated by the inspection unit 70 to be rejected are directed upward by the first sorting gate 73*a* and stacked in the temporary stacking section 37 through the second and third sorting gates 73*b* and 73*c.* In this case, bank note (loading bank note) picked up from the loading safe 3 and having passed through the second sorting gate 73*b* overlap on the reject bank notes in the convey path R4 between the second and third sorting gates 73*b* and 73*c.* For this reason, when a reject bank note is detected, the pick-up of the loading bank notes is instantaneously interrupted, and resumed after the reject bank note passes the convey path R4. Alternatively, the fetched bank notes (loading bank note) and reject bank notes overlapping one another may be conveyed and stacked together in the temporary stacking section 37.

When all of the bank notes P in the loading safe 3 run out, the loading operation is completed.

Figure 12:
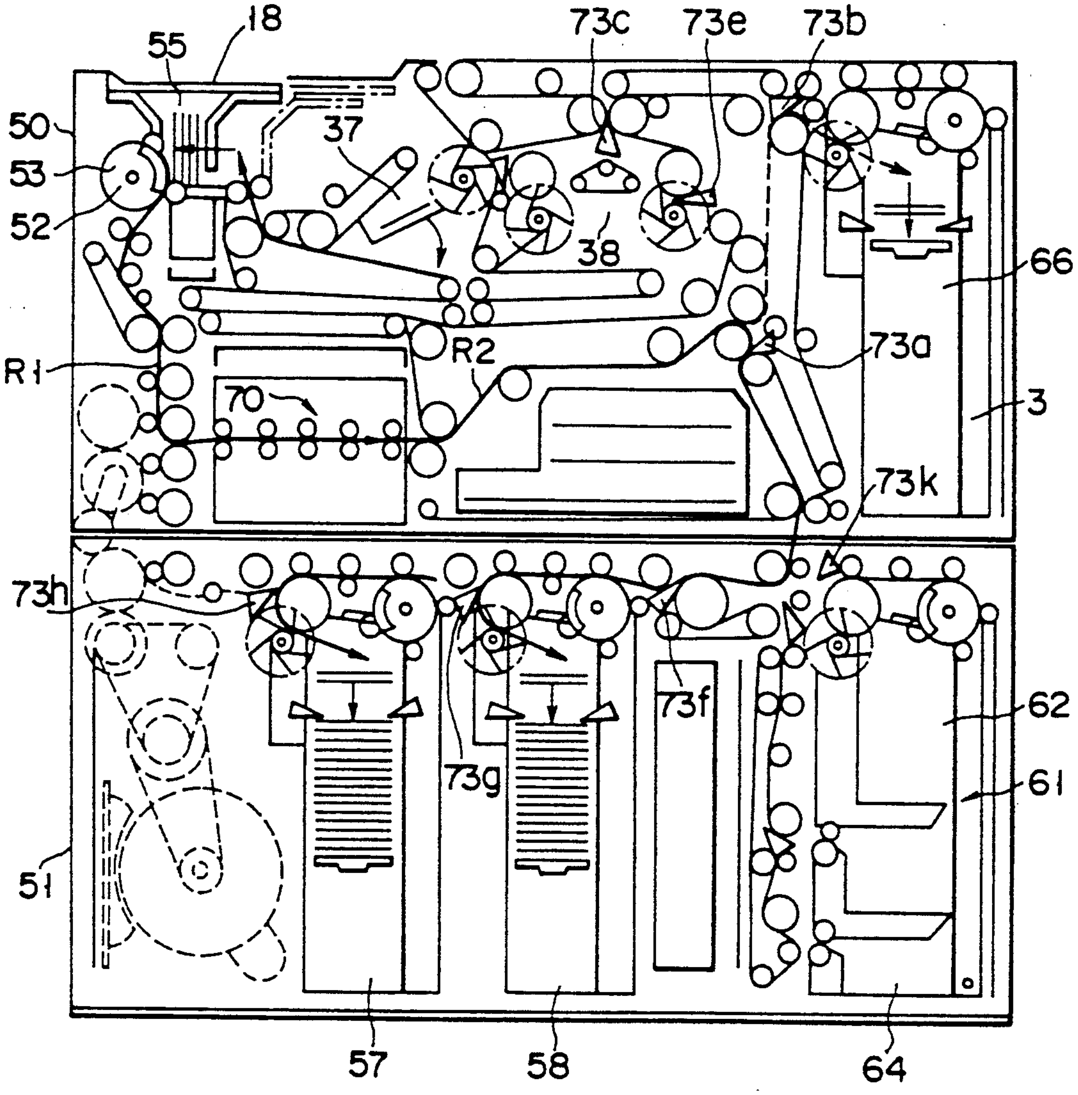

As shown in FIG. 12, the rejected bank notes P are conveyed to the bank note storage chamber 55 from the stacking section 37, received by the take-in roller 53 one by one, and are sent to the inspecting section 70 again. The bank notes, the denominations of which are discriminated, are guided to the lower unit 51 by the first sorting gate 73*a* and are stored in the safes 57 and 58 in accordance with their denominations.

A bank note which is rejected once again is guided upward through the first sorting gate 73*a,* redirected by the second sorting gate 73*b,* and returned to the loading safe 3.

In this embodiment, during the loading operation, the bank notes P are loaded only from the loading safe 3. However, in this system, bank notes can be loaded in the safes by setting bank notes in the storage section 62 of the bank note reception safe 61 and conveying them to the safes.

Figure 13:
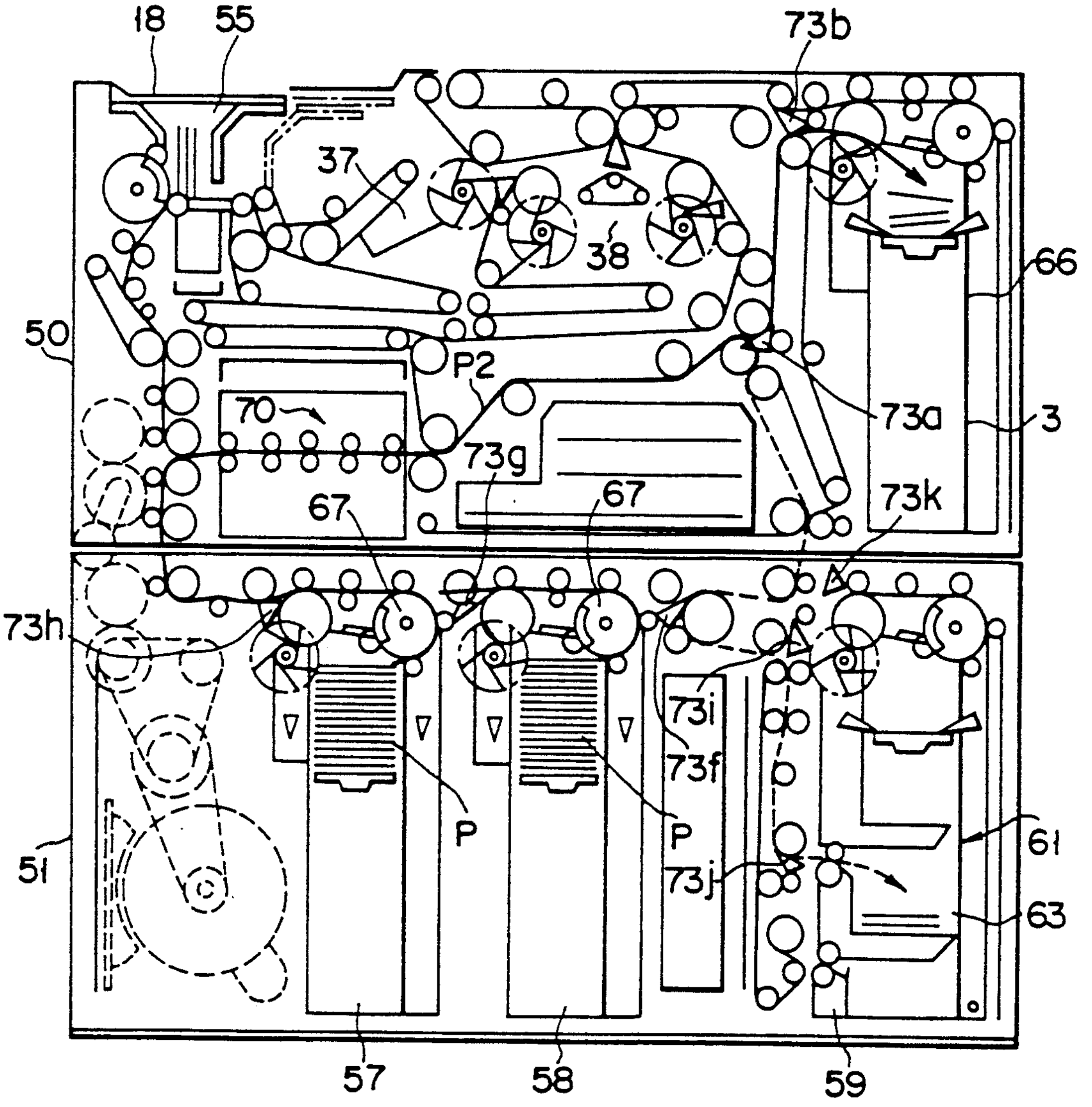

The flow of bank notes in a checking operation will be described with reference to FIG. 13.

Specifically, bank note P taken-out of the ¥10,000 or ¥1,000 bank note safe 57 or 58 are conveyed to the upper unit 50, discriminated by the inspecting section 70, redirected by the first and second sorting gates 73*a* and 73*b*, and stored in the loading safe 3. When reject bank notes such as them which cannot be discriminated are generated in the inspecting section 70, they are conveyed downward through the first gate 73*a* and stacked in the stacking section 63 of the bank note reception safe 61 through the eleventh, sixth, ninth, and tenth sorting gates 73*k*, 73*f*, 73*i*, and 73*j*.

Figure 14:
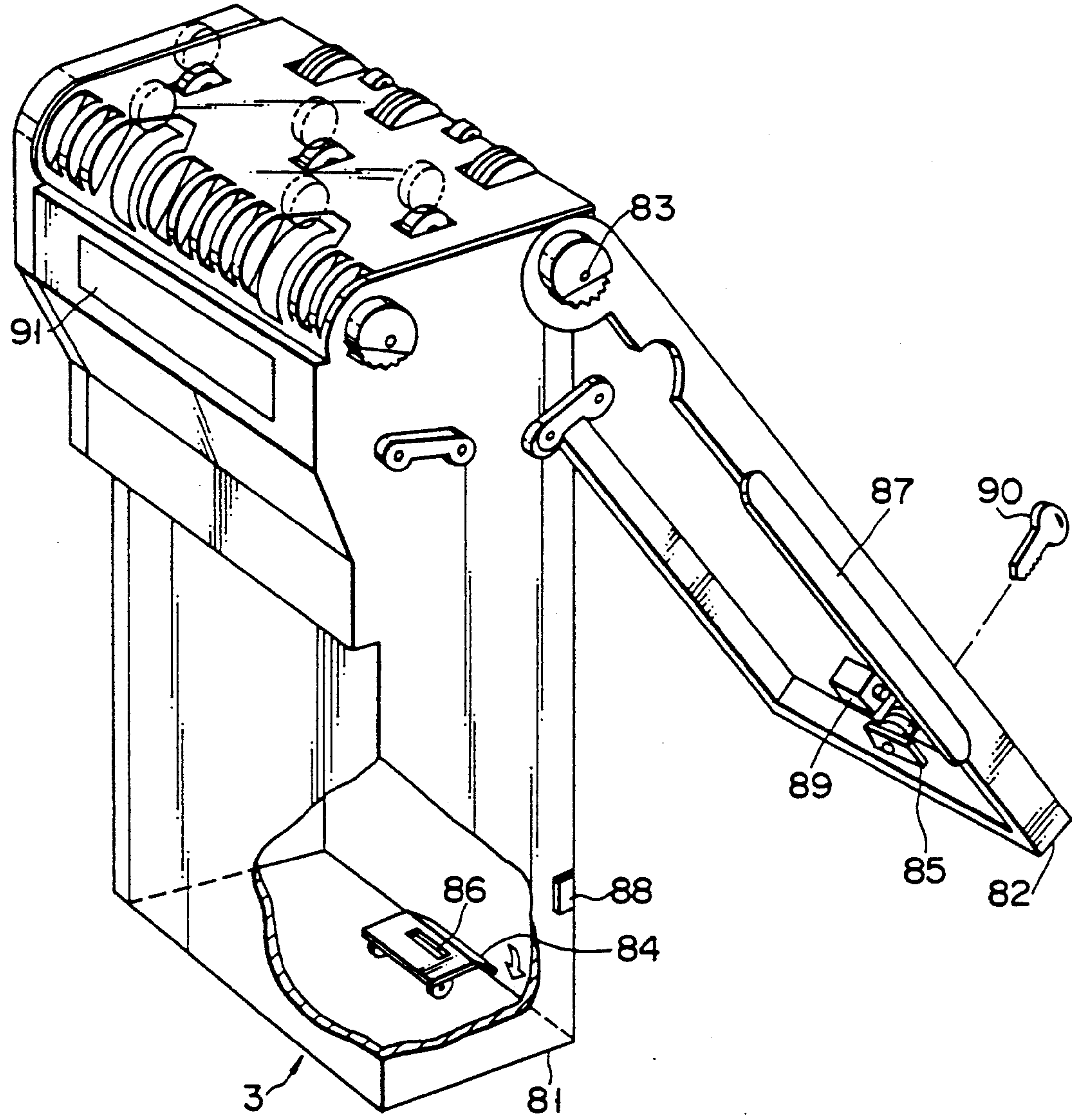

As shown in FIG. 14, each loading safe 3 has a rectangular box-like main body 81, one side wall of which constitutes a lid 82 rotatable about a take-out roller 83 for opening and closing. An automatic lock 84 for controlling opening/closing of the lid 82 is provided in the central portion of the bottom of the main body 81, and a hole 86 engaging with a lock plate 85 of the lid 82 is formed on the central portion of the automatic lock 84. A detector 88 is provided on a side surface of the main body 81. The detector 88 detects loading/unloading of the loading safe 3 to and from the bank note reception/dispensing unit 35, by means of a magnetic force of a magnet 87 on the lid 82. A lock mechanism 89 for controlling opening/closing of the lid 82 is provided at a lower central portion of the lid 82. A locking plate 85 for engaging with the hole 86 is provided to the lock mechanism 89. When the lock can be released, the lock plate 85 is rotated by an external key 90 thereby allowing the lid 82 to be opened. A display unit 91 is provided on an upper front surface of the main body 81.

Figure 15:
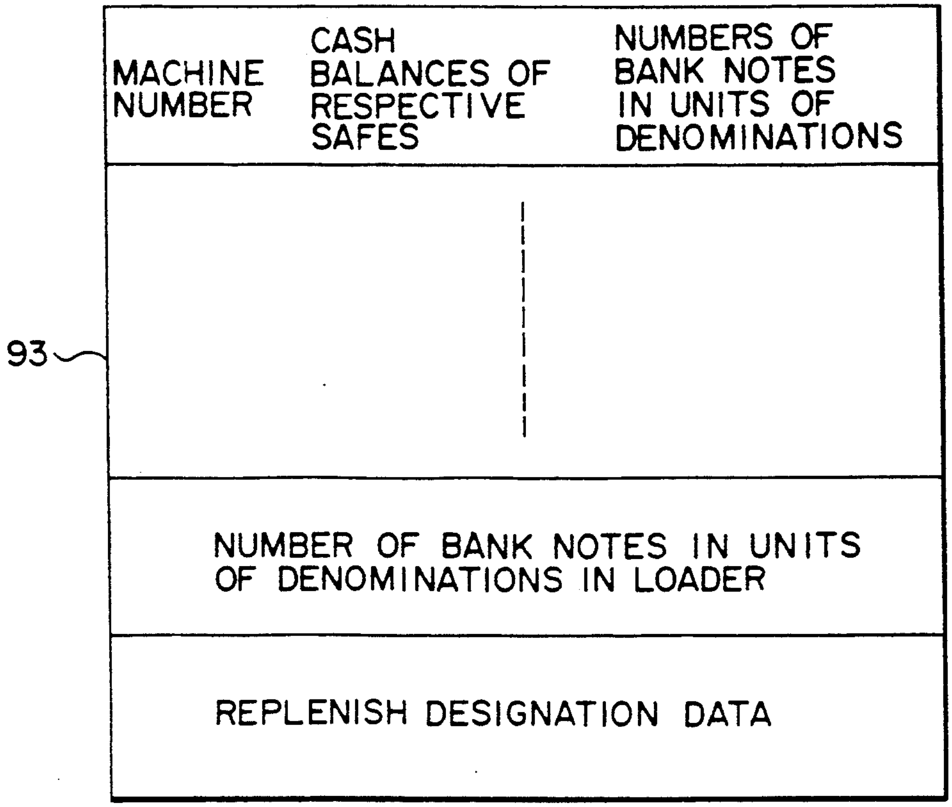

As shown in FIG. 2, the control circuit of the loading safe 3 includes a control section 92 for controlling the entire operation of the loading safe 3, a data memory 93 (second memory means), an interface 94 used for connecting the safe 3 with the teller machine and adjuster 2, a ROM 95 storing a program for controlling the safe 3, a bank note convey mechanism 96 for taking bank notes in and out of the safe 3, warning means 99 for giving warning with the use of the display unit 91, the detector 88, and a buzzer or a chime. The data memory 93 stores the number (serving as identification data of the safe) of the safe 3 it self, the number (serving as identification data) of the teller machine 1*a* in which the safe 3 is mounted, the bank note storing state of the machine 1*a*, the count and denomination of the bank notes received in the safe 3, and replenishment designating data, as shown in FIG. 15. The memory 93 comprises a RAM backed up by a battery 97 and constitutes first memory means having a predetermined memory guarantee time period. Alternatively, the memory 93 may consist of an EEPROM whose content can be rewritten by a predetermined number of times, for example, 10000 times.

In order to clarify the management content of the loading safe 3, a detector (not shown) for detecting opening/closing of the lid 82 is provided at the lid 82 of the safe 3. When the lid 82 is manually opened, the bank note data stored in the data memory 93 of the safe 3 is cleared, and no data is input in the memory 93 until the amount of the bank notes in the safe 3 is checked by the bank note arrangement device 2.

Figure 16:
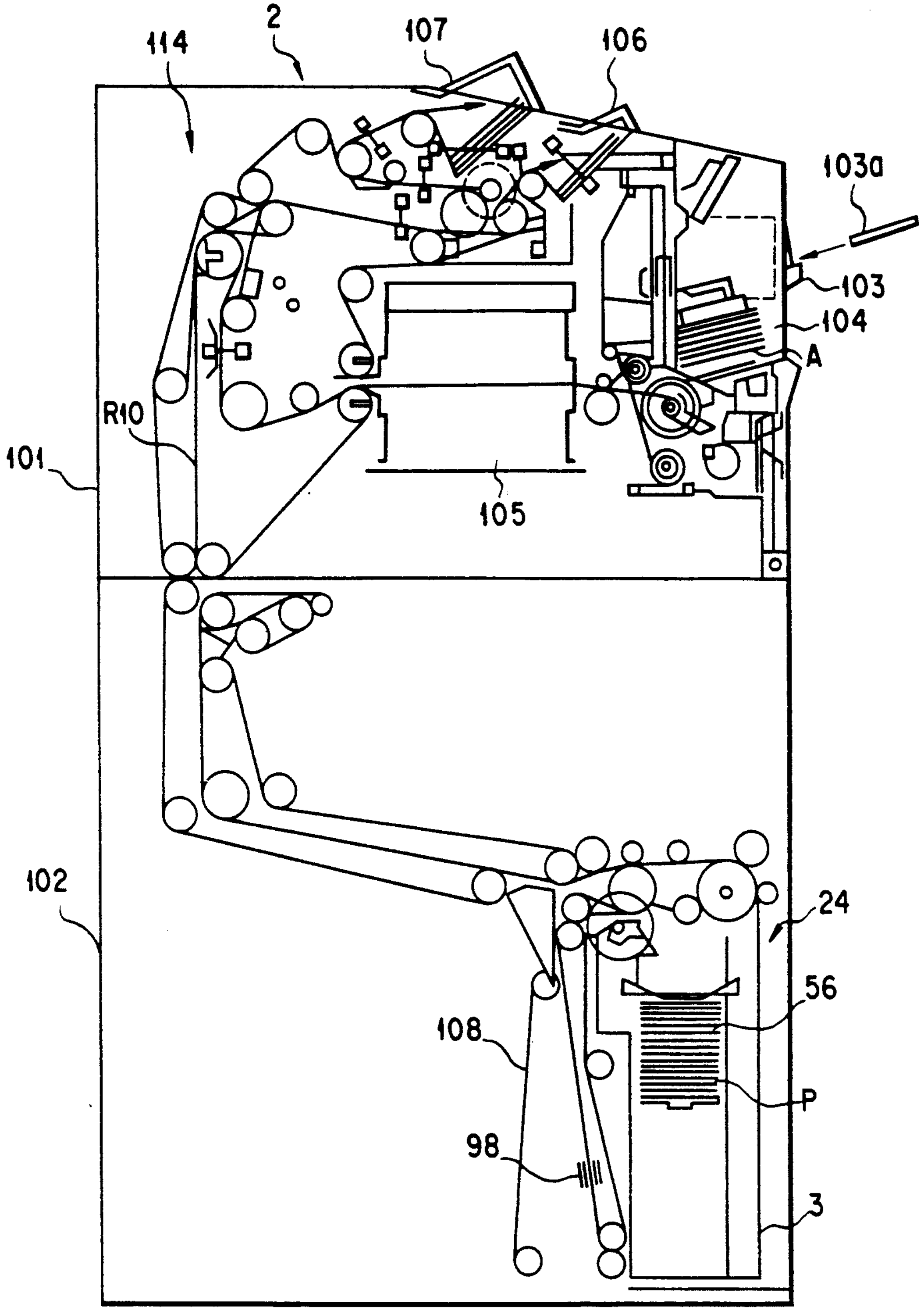

As shown in FIG. 16, the bank note arrangement device 2 has a counter unit 101 and a storage unit 102 for replenishing bank notes P in the loading safe 3. An ID card insertion slot 103 for receiving an ID card 103*a* storing an operator number and the like is formed in the front surface of the counter unit 101. The counter unit 101 has a hopper 104 under the ID card insertion slot 103. Under the insertion slot 103 is arranged a hopper 104 into which bank notes P to be replenished in the safe 3 are placed. An inspection unit 105 for discriminating the denominations of the bank notes P sequentially picked up from the hopper 104 is provided in the central portion of the unit 101. In the upper portion of the unit 101 are arranged a stacking section 106 for stacking rejected bank notes and a stacking unit 107 for stacking defaced bank notes adjacent to the stacking unit 106. A bank note P discriminated as a reject bank note by the inspection unit 105 is conveyed to the stacking unit 106, and a bank note P discriminated as a defaced bank note by the inspection unit 105 is conveyed to the stacking unit 107.

The storage unit 102 has a mount section 24 to which the loading safe 3 is detachably fitted. Bank notes P discriminated as being authentic by the inspection unit 105 are conveyed to the safe 3 through a convey path R10, and stored in the storage section 56 of the safe 3.

As shown in FIG. 2, the control circuit of the bank note arrangement device 2 includes a control section 110 for controlling the overall operation thereof and identifying the mounted loading safe 3, a data memory 111 as first memory means, an interface 112 to which the interface 94 of the safe 3 is to be connected, a ROM 113 for storing a control program, a bank note convey mechanism 114 for conveying bank notes through the path R10 and the like, a display unit 115, the inspection unit 105, a printer 117 for printing the bank note storing state of the respective teller machines, an input portion 118 formed of a card or a keyboard and functioning as data supply means, hereinafter referred to, and a warning device 119 for giving warning under the control of the control section 110, using a buzzer or a chime.

Figure 17:
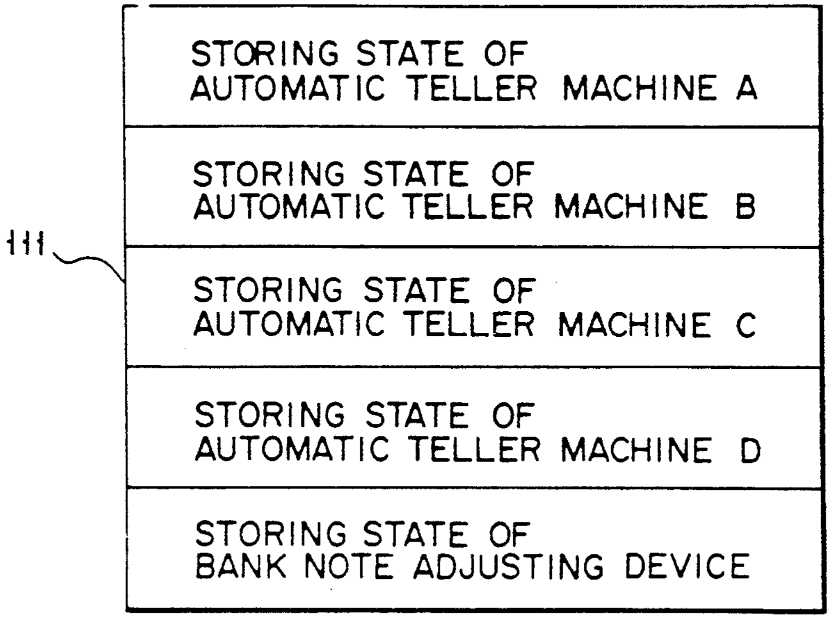

As shown in FIGS. 17, 18A and 18B, the data memory 111 stores data items input by the manager, such as identification data (machine number) of each teller machine and data on the bank note storing state of it, predetermined time data (collecting date and hour data) of any of the loading safe 3 which should be collected, data on a set time period of each loading safe 3 shorter than the memory guarantee time period of the data memory 93, and data on the bank note storing state of the bank note arrangement device 2. The data memory 111 comprises an EEPROM or a RAM backed up by a battery (not shown).

When the loading safe 3 is loaded in or unloaded from the bank note arrangement device 2, the input portion 118 supplies the loading safe 3 with the identification data on each teller machine and the data on the bank note storing state of it, which are stored in the data memory 111.

Then, a description will be given of the operation of supplying data and bank notes to the loading safe 3 by means of the bank note arranging device 2, and the collecting operation of the loading safes 3.

Figure 19:
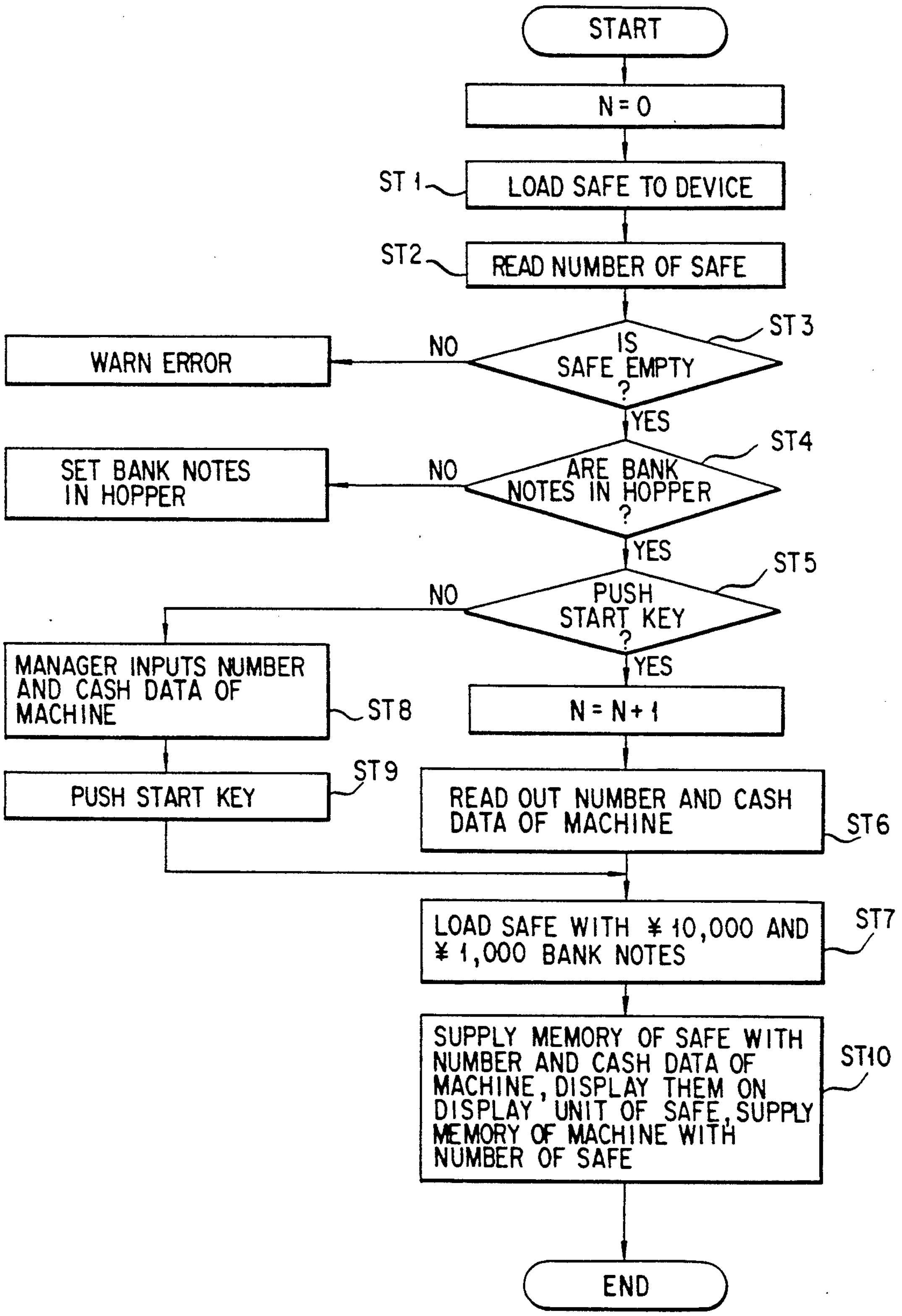

As is illustrated in the flowchart of FIG. 19, at the time of supplying cash data from the bank note arranging device 2 to the loading safes 3, the clerk first loads any one of the loading safes 3 to the arrangement device 2 (ST1). The arrangement device 2 causes the control section 110 to automatically read, from the data memory 93 of the loaded safe, data indicating the number of the loaded safe (ST2) and confirm whether or not the safe is empty (ST3) by means of a sensor (not shown). If bank notes exist in the safe 3, error warning is generated by the arranging device 2. Then, the arranging device 2 confirms whether or not the hopper 104 is filled with bank notes (ST4). If the amount of the bank notes in the hopper 104 is insufficient, the clerk loads bank notes in the hopper. Subsequently, the clerk pushes the start key of the input portion 118 (ST5), thereby causing the control section 110 to automatically read, from the data memory 111 of the bank note arrangement device 2, data indicating the number of the teller machine, and the amount of cash to be received in the teller machine, for example, one thousand ¥10000 bank notes and one thousand ¥1000 bank notes (ST6). The bank note transfer mechanism 114 operates under the control of the control section 110, and provides the safe 3 with, e.g., one thousand ¥10000 bank notes and one thousand ¥1000 bank notes corresponding to the read-out cash data (ST7).

On the other hand, if the start key is not pushed by the clerk (ST5) and the manager inputs data indicating the number of the teller machine and the amount of cash to be received in the teller machine, e.g., one thousand ¥10000 bank notes and one thousand ¥1000 bank notes (ST8), and thereafter pushes the start key of the input portion 118 (ST9), the bank note transfer mechanism 114 of the bank note arrangement device 2 operates under the control of the control section 110, and provides the safe 3 with, e.g., one thousand ¥10000 bank notes and one thousand ¥1000 bank notes corresponding to the input cash data (ST6).

Then, the read-out or input data is supplied to the data memory 93 and display unit 91 of the loading safe 3 via the control section 110, the interface 112, the interface 94 of the safe 3, and the control section 92, and is displayed on the display unit 91. Further, the control section 110 supplies the number of the loading safe 3 to the data memory 111 and writes it in a table of the memory, shown in FIG. 18A (ST10).

Thereafter, the clerk unloads the loading safe 3 from the bank note arrangement device 2, and loads the safe 3 in that one of the teller machines which corresponds to the machine number displayed on the display unit 91. For example, one (safe A) of the loading safes 3 loaded with one thousand ¥10000 bank notes is mounted in the teller machine 1*a* (machine number 1), and another (safe B) of the safes 3 loaded with five hundred ¥10000 bank notes is mounted in the teller machine 1*b* (machine number 2).

In the above-described processing, the machine number and cash data prestored in the data memory 111 can be input to the data memory 93 only by pushing the start key of the input portion 118 with the loading safe 3 mounted in the bank note arrangement device 2. Further, the clerk can correctly mount the loading safe 3 in a predetermined one of the teller machines in accordance with the machine number displayed on the display unit 91 of the safe 3. In addition, the manager's data-input operation can be clearly separated from the clerk's safe-handling.

Figure 20:
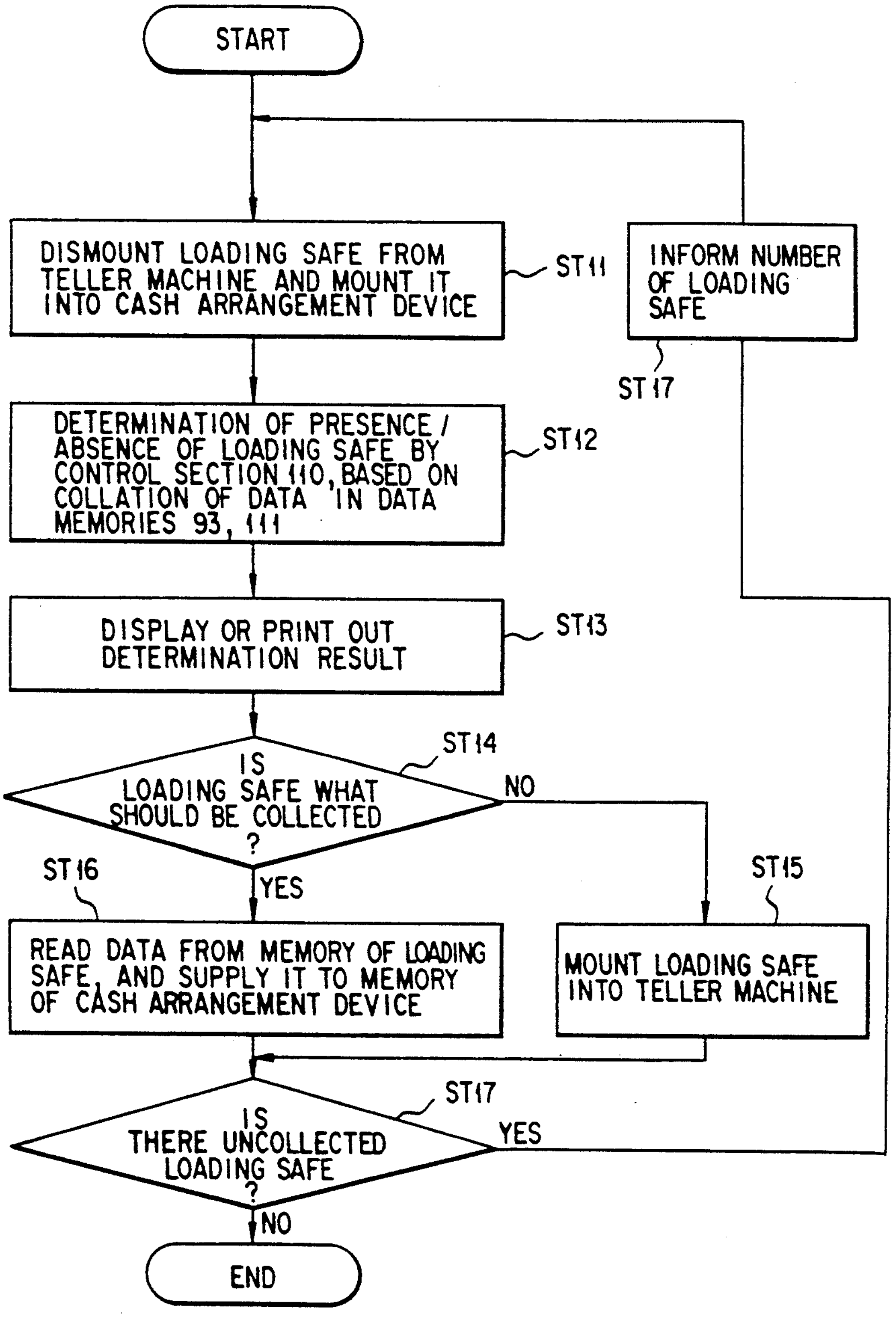

The collecting operation of the loading safes 3 will now be explained with reference to FIG. 20.

As is described above, the data memory 111 of the bank note arrangement device 2 prestores the identification data (machine number) of each teller machine, the time data (collecting date and hour) of each loading safe 3 mounted in a teller machine corresponding to the machine number, and the number of the loading safe to be collected at a common collecting time (see a table shown in FIG. 18B).

First, the clerk dismounts from the teller machine the loading safe 3, mounted therein and mounts the same in the bank note arrangement device 2 (ST11).

Then, based on the time data of the loading safe 3 stored in the data memory 111 and the number of the safe 3 stored in the data memory 93 of the safe 3, the control section 110, provided in the arrangement device 2 and functioning as collation means, determines whether or not the loading safe 3 which is mounted in the bank note arrangement device 2 is the one which should be collected at the time. The control section 110 also determines whether or not an uncollected loading safe or safes remains, by collating the numbers of the loading safes to be collected with the numbers of already-collected loading safes mounted in the bank note arrangement device 2 (ST12). Then, the device 2 causes the display unit 11 to display the determination results, and causes the printer 117 to print out the results (ST13). If these results indicate that the loading safe 3 loaded in the device 2 is not what should be collected, the loading safe 3 is returned to the corresponding teller machine (ST14, 15). If, on the other hand, the safe 3 is what should be collected, the control section 92 reads out the cash data of the teller machine stored in the date memory 93 of the safe, and inputs the read data to the data memory 111 of the bank note arrangement device 2 via the interfaces 94 and 112, and control section 110 (ST16).

If there is an uncollected loading safe or safes, the program returns to the step 11, and the arrangement device 2 informs the number of the uncollected loading safe or safes by means of the display unit 115 and the printer 117 (ST17). If there is no uncollected loading safe, the program is terminated.

By virtue of the above-described processing, it can be determined, without stopping any teller machine, whether or not all loading safes 3 are correctly collected, whether or not an uncollected loading safe remains, and how many bank notes remain in each loading safe and teller machine. Thus, total management of the cash managing system can be effectively performed.

Moreover, in the above embodiment, a collecting operation is carried out based on the memory guarantee time period of the data memory 93 in each loading safe 3, in addition to the collecting operation based on the above-described time data.

Figure 21:
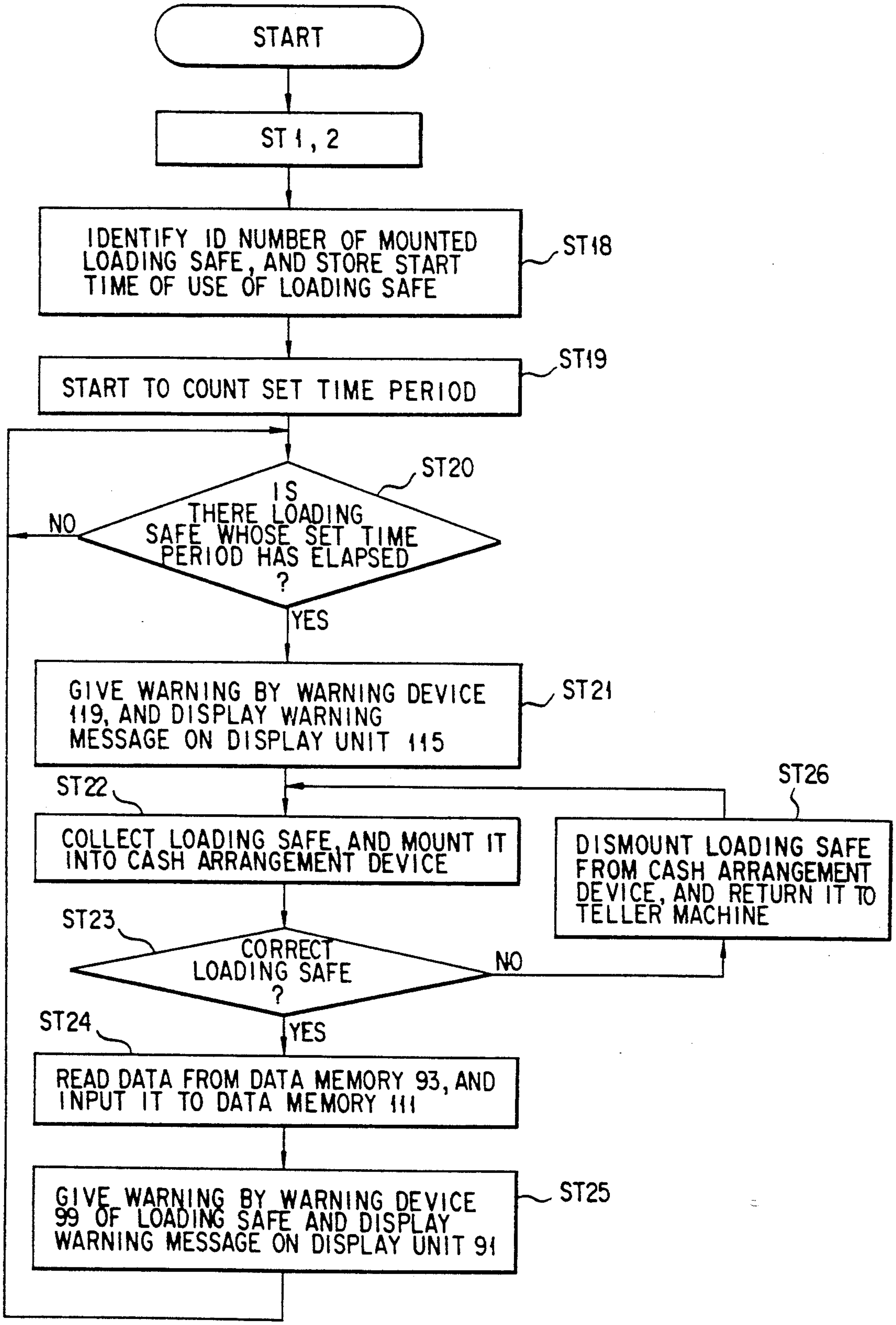

Specifically, the data memory 111 of the bank note arrangement device 2 prestores the identification data (numbers) of the loading safes 3, and data on a set time period shorter than the memory guarantee time period (=a time period during which data can reliably be stored, i.e., corresponding to the life of the battery 97) of the data memory 93. As is illustrated in the flowchart of FIG. 21, when the loading safe 3 is mounted in the arrangement device 2 in the steps 1 and 2 (FIG. 19), the control section 110 collates the number of the mounted safe 3 with the numbers stored in the data memory 111, and causes the data memory 111 to store, in the table shown in FIG. 18B, the starting time of the mounted safe as the data of the stored number corresponding to that of the mounted safe (ST18), thereby starting to count a time period elapsing from the starting time (ST19).

The control section 110 of the arrangement device 2 collates the set time period of each safe 3 stored in the data memory 111, with the counted time period (ST20). If there is a safe whose set time period has elapsed, the unit 110 causes a warning device 119 to generate warning, and the display unit 115 to display a warning message and the number of the safe (ST21). The warning message may be printed out by the printer 117. At this time, the clerk dismounts from the teller machine the safe 3 displayed on the display unit 115, and mounts the same in the arrangement device 2 (ST22).

The control section 110 of the arrangement device 2 collates the number of the mounted safe 3 with that of the safe whose set time period has elapsed (ST23), and reads the cash data of the teller machine from the data memory 93 of the mounted safe if those numbers coincide with each other, thereby inputting the read data to the data memory 111 of the arrangement device (ST24). Further, the control section 110 operates the warning device 99 of the safe 3 via the interfaces 112 and 94 and the control section 92 of the safe 3 to thereby give warning, and causes the display unit 91 to display a warning message (ST25). If, on the other hand, the numbers do not coincide with each other in the step 23, the safe 3 is dismounted from the arrangement device 2 and returned to the corresponding teller machine (ST26).

Thereafter, the operation illustrated in the flowchart of FIG. 19 will be repeated, using a new loading safe in place of the collected loading safe, or using the collected safe with the battery 97 replaced with a new one.

By performing the above-described collecting operation, the uncollected loading safe 3 can be checked within the memory guarantee time period of the data memory 93, without stopping the teller machines 1*a*–1*d*. Thus, the reliability of data stored in the data memory 93 of the loading safe 3 can be enhanced, thereby preventing management errors.

The invention is not limited to the above embodiments, but may be modified without departing from the scope thereof.

For example, a warning message may be supplied via cordless communication means to a management center such as a store equipped with a cash managing system, to thereby draw attention of the manager.

Further, where an EEPROM is used as the data memory 93 of the loading safe 3, the collecting time of the safe may be managed by using the number of occasions of data rewriting as data corresponding to the memory guarantee time period of the data memory.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept a defined by the appended claims and their equivalents.

What is claimed is:

1. A cash managing system comprising:

a plurality of automatic teller machines for receiving and dispensing cash;

a cash arrangement device for arranging cash to be handled in the teller machines; and a plurality of loading safes each of which is selectively mounted in one of the teller machines and the cash arrangement device, for transferring cash between the teller machine and the cash arrangement device;

said cash arrangement device including:

memory means for storing cash data with respect to each teller machine, including denominations and the amount of cash to be loaded in each teller machine, a mount section for detachably storing the loading safe, and transfer means for transferring cash to the loading safe mounted in the mount section, based on the denomination and amount stored in the memory means.

2. A cash managing system according to claim 1, wherein said cash management device includes means for reading out the cash data from the memory means at each time when any one of the loading safe is mounted in the mount section and actuating the transfer means to transfer cash to the loading safe based on the read out cash data.

3. A cash managing system according to claim 1, wherein each of said loading safes includes second memory means for storing data, and said cash management device includes means for supplying the second memory means of the mounted loading safe with identification data of that teller machine in which the loading safe is to be mounted.

4. A cash managing system according to claim 3, wherein each of said loading safe includes means for displaying the identification data of the teller machine.

5. A cash managing system comprising:

a plurality of automatic teller machines for receiving and dispensing cash;

a cash arrangement device for arranging cash to be handled in the teller machines; and a plurality of loading safes each of which is selectively mounted in one of the teller machines and the cash arrangement device, for transferring cash between the teller machine and the cash arrangement device;

each of said loading safes including first memory means for storing identification data of the loading safe; and said cash arrangement device including:

second memory means for storing the identification data and collecting time of the loading safes to be collected, means for collating the identification data stored in the first memory means of the loading safe which is mounted in the cash arrangement device with the identification data of the loading safe stored in the second memory means, and means for displaying the collation result.

6. A cash managing system according to claim 5, wherein said collation means includes means for determining whether or not there is a loading safe which is uncollected even after the collecting time, and means for actuating the display means, when there is an uncollected loading safe, to display the identification data of the uncollected loading safe.

7. A cash managing system comprising:

a plurality of automatic teller machines for receiving and dispensing cash;

a cash arrangement device for arranging cash to be handled in the teller machines; and a plurality of loading safes each of which is selectively mounted in one of the teller machines and the cash arrangement device, for transferring cash between the teller machine and the cash arrangement device;

each of said loading safes including first memory means for storing identification data of the loading safe, the first memory means having a predetermined a memory guarantee time period; and said cash arrangement device including:

second memory means for storing the identification data of the loading safes and the memory guarantee time period of the first memory means, means for determining whether or not there is a first memory means whose memory guarantee time period has elapsed, and means for displaying the identification data of the loading safe having the first memory means whose memory guarantee time period has elapsed.

8. A cash managing system according to claim 7, wherein said cash arrangement device includes means for detecting whether or not the loading safe mounted in the cash arrangement device is the one having the first memory means whose memory guarantee time period has elapsed, based on the identification data stored in the first memory means.

9. A cash managing system according to claim 8, wherein each of said loading safe includes means for displaying a warning message which warns that the loading safe is impossible to use, when the detecting means detects that the memory guarantee time period of the first memory means has elapsed.

10. A cash managing system according to claim 8, wherein the first memory means of each of said loading means stores denominations and amount of cash stored in the loading safe, and said cash arrangement device includes means for transferring the data stored in the first memory means to the second memory means.

* * * * *